United States Patent
Weckter

(10) Patent No.: US 6,179,534 B1
(45) Date of Patent: Jan. 30, 2001

(54) STRAP ROLLER DEVICE

(76) Inventor: Jerry R. Weckter, 15491 Firewood Dr., Conroe, TX (US) 77303

(*) Notice: Under 35 U.S.C. 154(b), the term of this patent shall be extended for 0 days.

(21) Appl. No.: 09/473,091

(22) Filed: Dec. 28, 1999

(51) Int. Cl.⁷ ..................................................... B60P 7/08
(52) U.S. Cl. ........................ 410/103; 410/100; 410/106; 242/395
(58) Field of Search .................... 410/97, 100, 101, 410/103, 106; 242/395, 404, 404.2, 129.3, 532.6; 24/68 CD, 265 CD; 254/323

(56) References Cited

U.S. PATENT DOCUMENTS

| | | | |
|---|---|---|---|
| 2,946,563 | * | 7/1960 | Eaton ................................ 410/103 X |
| 3,240,473 | * | 3/1966 | Coffey et al. ........................ 410/103 |
| 3,697,045 | * | 10/1972 | Farley .................................. 410/103 |
| 3,954,226 | * | 5/1976 | Pickering ........................ 242/395 X |
| 4,390,141 | * | 6/1983 | Webster ........................... 410/100 X |
| 5,186,410 | * | 2/1993 | Toews . |
| 5,338,136 | * | 8/1994 | Hetchler ............................... 410/100 |
| 5,791,844 | * | 8/1998 | Anderson ............................. 410/103 |
| 5,961,263 | * | 10/1999 | Nunez ................................. 410/103 |
| 5,993,127 | * | 11/1999 | Shinn ................................. 410/100 |

\* cited by examiner

*Primary Examiner*—Stephan T. Gordon

(57) ABSTRACT

A strap roller device for rolling up cargo straps more quickly and with little effort. The strap roller device includes a base having a mounting bracket and a tubular member having open ends and a bore extending therethrough and being securely attached to the mounting bracket, and further includes a strap take-up which includes an elongate member having a longitudinal slot in a first end thereof and having a recessed portion which is rotatably disposed in the bore of the tubular member, the strap take-up also including a handle support member and a handle member used to rotate the elongate member for taking up the cargo strap received in the longitudinal slot.

11 Claims, 1 Drawing Sheet

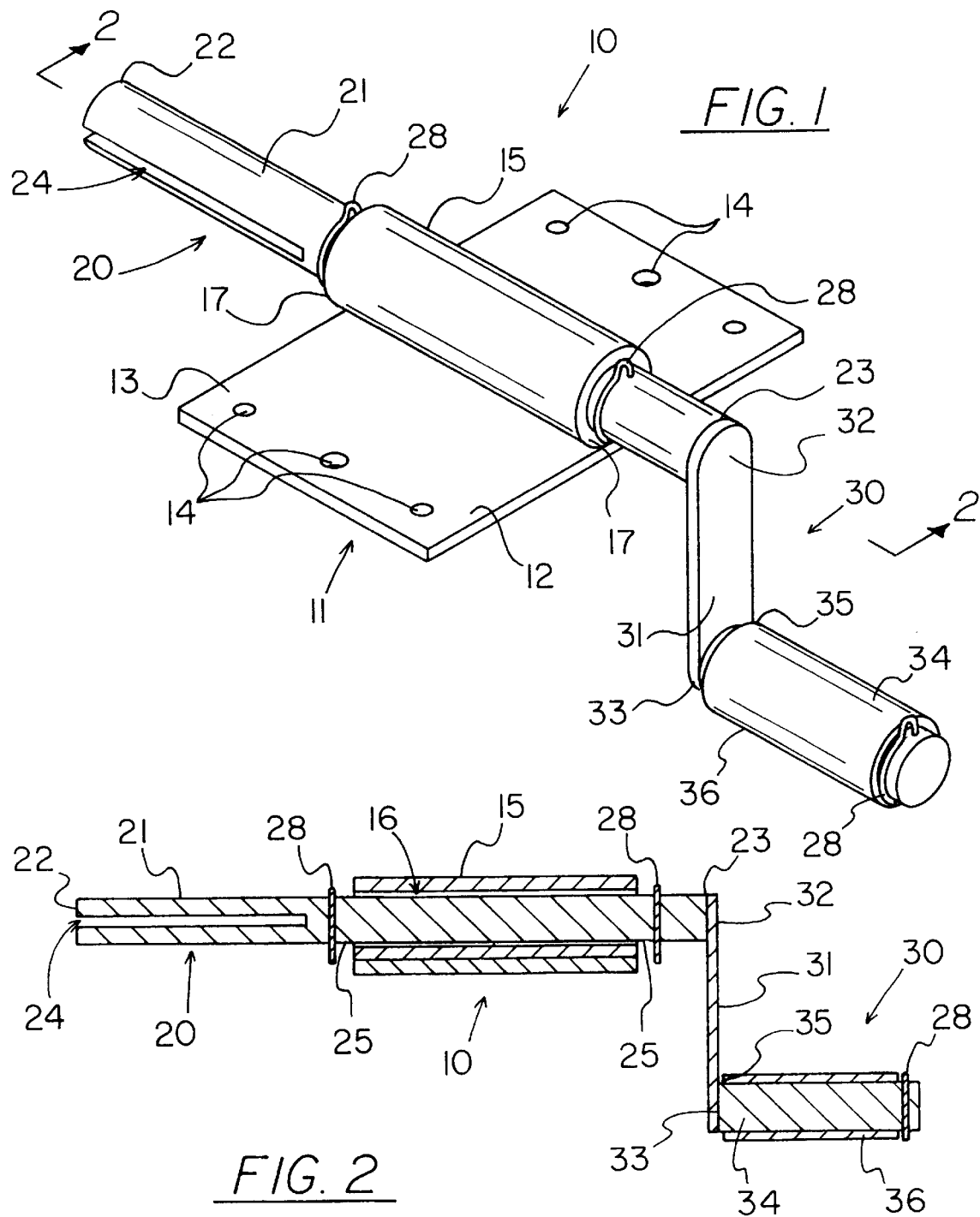

STRAP ROLLER DEVICE

BACKGROUND OF THE INVENTION

1. Field of the Invention

The present invention relates to a cargo strap take-up device and more particularly pertains to a new strap roller device for rolling up cargo straps more quickly and with little effort.

2. Description of the Prior Art

The use of a cargo strap take-up device is known in the prior art. More specifically, a cargo strap take-up device heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 5,338,136; 3,240,473; U.S. Pat. No. Des. 298,078; U.S. Pat. Nos. 3,697,045; 5,791,844; and 2,738,240.

While these devices fulfill their respective, particular objectives and requirements, the aforementioned patents do not disclose a new strap roller device. The inventive device includes a base having a mounting bracket and a tubular member having open ends and a bore extending therethrough and being securely attached to the mounting bracket, and further includes a strap take-up means which includes an elongate member having a longitudinal slot in a first end thereof and having a recessed portion which is rotatably disposed in the bore of the tubular member, the strap take-up means also including a handle support member and a handle member used to rotate the elongate member for taking up the cargo strap received in the longitudinal slot.

In these respects, the strap roller device according to the present invention substantially departs from the conventional concepts and designs of the prior art, and in so doing provides an apparatus primarily developed for the purpose of rolling up cargo straps more quickly and with little effort.

SUMMARY OF THE INVENTION

In view of the foregoing disadvantages inherent in the known types of a cargo strap take-up device now present in the prior art, the present invention provides a new strap roller device construction wherein the same can be utilized for rolling up cargo straps more quickly and with little effort.

The general purpose of the present invention, which will be described subsequently in greater detail, is to provide a new strap roller device apparatus and method which has many of the advantages of the a cargo strap take-up device mentioned heretofore and many novel features that result in a new strap roller device which is not anticipated, rendered obvious, suggested, or even implied by any of the prior art a cargo strap take-up device, either alone or in any combination thereof.

To attain this, the present invention generally comprises a base having a mounting bracket and a tubular member having open ends and a bore extending therethrough and being securely attached to the mounting bracket, and further includes a strap take-up means which includes an elongate member having a longitudinal slot in a first end thereof and having a recessed portion which is rotatably disposed in the bore of the tubular member, the strap take-up means also including a handle support member and a handle member used to rotate the elongate member for taking up the cargo strap received in the longitudinal slot.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new strap roller device apparatus and method which has many of the advantages of the a cargo strap take-up device mentioned heretofore and many novel features that result in a new strap roller device which is not anticipated, rendered obvious, suggested, or even implied by any of the prior art a cargo strap take-up device, either alone or in any combination thereof.

It is another object of the present invention to provide a new strap roller device which may be easily and efficiently manufactured and marketed.

It is a further object of the present invention to provide a new strap roller device which is of a durable and reliable construction.

An even further object of the present invention is to provide a new strap roller device which is susceptible of a low cost of manufacture with regard to both materials and labor, and which accordingly is then susceptible of low prices of sale to the consuming public, thereby making such strap roller device economically available to the buying public.

Still yet another object of the present invention is to provide a new strap roller device which provides in the apparatuses and methods of the prior art some of the advantages thereof, while simultaneously overcoming some of the disadvantages normally associated therewith.

Still another object of the present invention is to provide a new strap roller device for rolling up cargo straps more quickly and with little effort.

Yet another object of the present invention is to provide a new strap roller device which includes a base having a mounting bracket and a tubular member having open ends and a bore extending therethrough and being securely attached to the mounting bracket, and further includes a strap take-up means which includes an elongate member having a longitudinal slot in a first end thereof and having a recessed portion which is rotatably disposed in the bore of the tubular member, the strap take-up means also including a handle support member and a handle member used to rotate the elongate member for taking up the cargo strap received in the longitudinal slot.

Still yet another object of the present invention is to provide a new strap roller device that substantially reduces the time to roll up cargo straps.

Even still another object of the present invention is to provide a new strap roller device that is easy to set up and easy to use.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of a new strap roller device according to the present invention.

FIG. 2 is a side cross-sectional view of the present invention.

DESCRIPTION OF THE PREFERRED EMBODIMENT

With reference now to the drawings, and in particular to FIGS. 1 through 2 thereof, a new strap roller device embodying the principles and concepts of the present invention and generally designated by the reference numeral 10 will be described.

As best illustrated in FIGS. 1 through 2, the strap roller device 10 generally comprises a base means 11 including a mounting bracket 12 having a top side 13 and a bottom side. The base means 11 further includes a tubular member 15 having open ends 17 and a bore 16 extending therethrough and being securely attached or welded to a top side 13 of the mounting bracket 12. The mounting bracket 12 is a plate-like member having a plurality of holes 14 spaced along a perimeter thereof. The plate-like member 12 is adapted to securely fasten with fasteners to a semi-truck trailer.

The strap roller device 10 further includes a strap take-up means 20 including an elongate member 21 having a first end 22 and a second end 23 and having a longitudinal slot 24 extending in the first end 22. The elongate member 21 is rotatably received and supported through the bore 16 of the tubular member 15. The take-up means 20 further includes a handle means 30 including a handle support member 31 securely and conventionally attached to the second end 23 of the elongate member 21, and a handle member 34 mounted to the handle support member 31. The strap take-up means 20 further includes a plurality of fastening members 28 for securing the elongate member 21 to the base means 11. The elongate member 21 includes a recessed portion 25 intermediate of the first 22 and second 23 ends thereof. The recessed portion 25 is removably and rotatably disposed within the bore 16 of the tubular member 15. The slot 24 is adapted to receive a portion of a cargo strap used to strap down objects upon a semi-truck trailer. The slot 24 extends from the first end 22 to near the recessed portion 25 of the elongate member 21. The handle support member 31 has a first end 32 and a second end 33 and is disposed perpendicular to the elongate member 21 with the first end 32 of the handle support member 31 being securely and conventionally attached to the second end 23 of the elongate member 21. The handle member 34 is disposed perpendicular to the handle support member 31 and has a first end 35 and a second end. The first end 35 of the handle member 35 is securely and conventionally attached at the second end 33 of the handle support member 31. Two of the fastening members 28 are fastened about the recessed portion 25 and are proximately disposed beyond either of the ends 17 of the tubular member 15 to substantially prevent the elongate member 21 from being uncontrollably removed from within the tubular member 15. The handle means 30 further includes a handle grip 36 being rotatably and securely mounted upon the handle member 34 with one of the plurality of fastening members 28. The fastening members 28 are essentially snap rings.

In use, the user inserts an end portion of the cargo strap in the slot 24 of the elongate member 21 and grasps the handle member 34 and rotates the elongate member 21 which takes up the cargo strap in a roll. Once finished, the user can remove the roll of cargo strap from the elongate member 21 and can remove the fastening members 28 about the elongate member 21 to remove and store the strap take-up means 20 for another time.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A strap roller device comprising:
   a base including a mounting bracket having a top side and a bottom side, said base further including a tubular member having open ends and a bore extending therethrough and being securely attached to said top side of said mounting bracket;
   a strap take-up assembly including an elongate member having a first end and a second end and having a longitudinal slot extending in said first end and being received and supported through said bore of said tubular member, said take-up assembly further including a handle assembly including a handle support member securely attached to said second end of said elongate member and a handle member mounted to said handle support member;

wherein said strap take-up assembly further includes a plurality of fastening members for securing said elongate member to said base;

wherein said elongate member includes a recessed portion intermediate of said first and second ends thereof; and wherein said recessed portion is removably and rotatably disposed in said bore of said tubular member.

2. A strap roller device as described in claim 1, wherein said mounting bracket is a plate-like member having a plurality of holes spaced along a perimeter thereof, said plate-like member being adapted to securely fasten to a semi-truck trailer.

3. A strap roller device as described in claim 1, wherein two of said fastening members are fastened about said recessed portion and are disposed beyond either of said ends of said tubular member to substantially prevent said elongate member from being uncontrollably removed from within said tubular member.

4. A strap roller device as described in claim 1, wherein said handle assembly further includes a handle grip being rotatably and securely mounted upon said handle member with one of said plurality of fastening members.

5. A strap roller device as described in claim 4, wherein said fastening members comprise snap rings.

6. A strap roller device as described in claim 1, wherein said slot is adapted to receive a portion of a cargo strap used to strap down objects upon a semi-truck trailer.

7. A strap roller device as described in claim 6, wherein said slot extends from said first end to near said recessed portion of said elongate member.

8. A strap roller device as described in claim 7, wherein said handle support member has a first end and a second end and is disposed perpendicular to said elongate member with said first end of said handle support member being securely attached to said second end of said elongate member.

9. A strap roller device as described in claim 8, wherein said handle member is disposed perpendicular to said handle support member and has a first end and a second end, said first end of said handle member being securely attached at said second end of said handle support member.

10. A strap roller device comprising:

a base including a mounting bracket having a top side and a bottom side, said base further including a tubular member having open ends and a bore extending therethrough and being securely attached to said top side of said mounting bracket, said mounting bracket being a plate-like member having a plurality of holes spaced along a perimeter thereof, said plate-like member being adapted to securely fasten to a semi-truck trailer; and a strap take-up assembly including an elongate member having a first end and a second end and having a longitudinal slot extending in said first end and being received and supported through said bore of said tubular member, said take-up assembly further including a handle assembly including a handle support member securely attached to said second end of said elongate member and a handle member mounted to said handle support member, said strap take-up assembly further including a plurality of fastening members for securing said elongate member to said base, said elongate member including a recessed portion intermediate of said first and second ends thereof, said recessed portion being removably and rotatably disposed within said bore of said tubular member, said slot being adapted to receive a portion of a cargo strap used to strap down objects upon a semi-truck trailer, said slot extending from said first end to near said recessed portion of said elongate member, said handle support member having a first end and a second end and being disposed perpendicular to said elongate member with said first end of said handle support member being securely attached to said second end of said elongate member, said handle member being disposed perpendicular to said handle support member and having a first end and a second end, said first end of said handle member being securely attached at said second end of said handle support member, two of said fastening members being fastened about said recessed portion and being proximately disposed beyond either of said ends of said tubular member to substantially prevent said elongate member from being uncontrollably removed from within said tubular member, said handle assembly further including a handle grip being rotatably and securely mounted upon said handle member with one of said plurality of fastening members, said fastening members comprising snap rings.

11. A strap roller device comprising:

a base including a mounting bracket having a top side and a bottom side, said base further including a tubular member having open ends and a bore extending therethrough and being securely attached to said top side of said mounting bracket;

a strap take-up assembly including an elongate member having a first end and a second end and having a longitudinal slot extending in said first end and being received and supported through said bore of said tubular member, said take-up assembly further including a handle assembly including a handle support member securely attached to said second end of said elongate member and a handle member mounted to said handle support member;

wherein said elongate member includes a recessed portion intermediate of said first and second ends thereof; and wherein said recessed portion is removably and rotatable disposed in said bore of said tubular member.

* * * * *